United States Patent
Park et al.

(10) Patent No.: US 10,505,908 B2
(45) Date of Patent: *Dec. 10, 2019

(54) SYSTEM AND METHOD FOR AUTOMATIC WIRELESS CONNECTION BETWEEN A PORTABLE TERMINAL AND A DIGITAL DEVICE

(71) Applicant: Samsung Electronics Co., Ltd., Gyeonggi-do (KR)

(72) Inventors: Woo-Jin Park, Gyeonggi-do (KR); Jin-Hyoung Kim, Gyeonggi-do (KR); Jin-Wook Lee, Gyeonggi-do (KR); Je-Hyok Ryu, Gyeonggi-do (KR); Hun Lim, Gyeonggi-do (KR); Shin-Il Kang, Gyeonggi-do (KR); Gene-Moo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,304

(22) Filed: Jul. 19, 2017

(65) Prior Publication Data

US 2017/0317995 A1 Nov. 2, 2017

Related U.S. Application Data

(63) Continuation of application No. 12/705,230, filed on Feb. 12, 2010, now Pat. No. 9,722,979.

(30) Foreign Application Priority Data

Feb. 13, 2009 (KR) .................. 10-2009-0012146

(51) Int. Cl.
*H04L 29/06* (2006.01)
*H04L 29/12* (2006.01)
(Continued)

(52) U.S. Cl.
CPC .......... *H04L 63/06* (2013.01); *H04L 29/1232* (2013.01); *H04L 61/2092* (2013.01);
(Continued)

(58) Field of Classification Search
CPC ..... H04L 63/06; H04L 63/20; H04L 61/2092; H04L 29/1232; H04W 12/04; H04W 8/26; H04W 84/12; H04W 48/16; H04W 84/18

See application file for complete search history.

(56) References Cited

U.S. PATENT DOCUMENTS 5,715,516 A * 2/1998 Howard ............... H04B 7/0491
455/422.1
6,167,261 A * 12/2000 Amin ................... H04W 8/20
455/403

(Continued)

FOREIGN PATENT DOCUMENTS

EP  1 538 781  6/2005
EP  1 603 289  12/2005

(Continued)

OTHER PUBLICATIONS

Wikipedia, "Power on Self Test", https://en.wikipedia.org/wiki/Power-on_self-test, snapshot captured Aug. 1, 2019.*

(Continued)

*Primary Examiner* — Robert B Leung
*Assistant Examiner* — Thomas Ho
(74) *Attorney, Agent, or Firm* — The Farrell Law Firm, P.C.

(57) ABSTRACT

Methods and apparatuses are provided for automatic wireless connection to a digital device in a portable terminal. A phone number and an Electronic Serial Number (ESN) of the portable terminal are obtained. A Wireless Local Area Network (WLAN) is set to an Ad-hoc mode. A Service Set
(Continued)

Identifier (SSID) of the WLAN is automatically generated using the phone number and the ESN of the portable terminal. A security key of the WLAN is automatically generated using the phone number and the ESN of the portable terminal. An Internet Protocol (IP) address for the WLAN is automatically generated using the phone number and the ESN of the portable terminal. The digital device is wirelessly connected to using the IP address for the WLAN.

20 Claims, 6 Drawing Sheets

(51) Int. Cl.
 *H04W 12/04* (2009.01)
 *H04W 8/26* (2009.01)
 *H04W 48/16* (2009.01)
 *H04W 84/12* (2009.01)
 *H04W 84/18* (2009.01)

(52) U.S. Cl.
 CPC ............ *H04L 63/20* (2013.01); *H04W 12/04* (2013.01); *H04W 8/26* (2013.01); *H04W 48/16* (2013.01); *H04W 84/12* (2013.01); *H04W 84/18* (2013.01)

(56) References Cited

U.S. PATENT DOCUMENTS

| | | | | |
|---|---|---|---|---|
| 6,931,132 | B2 * | 8/2005 | Billhartz | H04L 63/0435 380/260 |
| 7,263,070 | B1 * | 8/2007 | Delker | H04L 29/12207 370/254 |
| 7,313,111 | B2 * | 12/2007 | Hietalahti | H04W 4/00 370/329 |
| 7,324,463 | B2 * | 1/2008 | Takada | H04M 3/565 370/259 |
| 7,499,438 | B2 | 3/2009 | Hinman et al. | |
| 7,941,122 | B2 | 5/2011 | Dowek et al. | |
| 10,257,705 | B2 * | 4/2019 | Bradley | H04W 12/08 |
| 2002/0083198 | A1 | 6/2002 | Kim et al. | |
| 2004/0236939 | A1 | 11/2004 | Watanabe et al. | |
| 2006/0098592 | A1 * | 5/2006 | Proctor, Jr. | H04B 7/026 370/315 |
| 2007/0070935 | A1 * | 3/2007 | Prakash | H04L 63/102 370/328 |
| 2007/0171910 | A1 * | 7/2007 | Kumar | H04L 63/0428 370/392 |
| 2008/0064367 | A1 * | 3/2008 | Nath | H04L 63/0492 455/411 |
| 2008/0137860 | A1 * | 6/2008 | Silvernail | H04W 12/04 380/270 |
| 2010/0180016 | A1 * | 7/2010 | Bugwadia | G06F 9/4411 709/220 |
| 2015/0172848 | A1 * | 6/2015 | Gao | H04W 52/0229 455/41.3 |

FOREIGN PATENT DOCUMENTS

| | | | | |
|---|---|---|---|---|
| EP | 1603289 | A1 * | 12/2005 | ......... H04W 76/021 |
| EP | 1603289 | A1 * | 12/2005 | |
| EP | 1 628 445 | | 2/2006 | |
| KR | 100369939 | | 1/2003 | |
| KR | 100639376 | | 10/2006 | |
| KR | 100649715 | | 11/2006 | |
| KR | 1020070040042 | | 4/2007 | |

OTHER PUBLICATIONS

Y. Rekhter et al., "Address Allocation for Private Internets", Network Working Group, Feb. 1996.

Y. Rekhter et al., "An Architecture for IP Address Allocation with CIDR", Network Working Group, Sep. 1993.

Cheshire et al, RFC 3927 "Dynamic Configuration of IPv4 Link-Local Addresses" May 2005, Internet Engineering Task Force, pp. 1-33.

* cited by examiner

SYSTEM AND METHOD FOR AUTOMATIC WIRELESS CONNECTION BETWEEN A PORTABLE TERMINAL AND A DIGITAL DEVICE

PRIORITY

This application is a Continuation Application of U.S. application Ser. No. 12/705,230, filed in the U.S. Patent and Trademark Office on Feb. 12, 2010, which claims priority under 35 U.S.C. § 119(a) to a Korean Patent Application filed in the Korean Intellectual Property Office on Feb. 13, 2009 and assigned Serial No. 10-2009-0012146, the entire disclosures of which are incorporated herein by reference.

BACKGROUND OF THE INVENTION

1. Field of the Invention

The present invention relates generally to a method for automatic wireless connection between a portable terminal and a digital device, and more particularly, to a system and method for automatic wireless connection between a portable terminal and a digital device, enabling a user to conveniently access a Wireless Local Area Network (WLAN).

2. Description of the Related Art

Compared with an existing wired Local Area Network (LAN) that communicates data to and from accessing devices through connecting cables, WLAN wirelessly communicates data to and from the accessing devices using Radio Frequency (RF) signals. WLAN communication may be classified into an infrastructure mode and an Ad-hoc mode. In the infrastructure mode, the WLAN communicates with a client through an Access Point (AP), and in the Ad-hoc mode, the WLAN communicates directly with clients.

Generally, because many digital devices (e.g., a portable terminal, a Personal Computer (PC), a camera, and a printer) do not support the AP function, they communicate with each other using the Ad-hoc mode. In order to access WLAN using the Ad-hoc mode, the digital devices use a Service Set Identifier (SSID) and a security key for authentication and encryption, and set an Internet Protocol (IP) address for IP communication. Because most new digital devices have a WLAN interface, a user connects these digital devices using the Ad-hoc mode of the WLAN. However, for Ad-hoc communication with WLAN, a WLAN connection process and an IP address setting process for IP communication are performed.

In the WLAN connection process, specifically, for an Ad-hoc connection, an SSID setting process and a security setting process are performed. In the WLAN SSID setting process, because WLAN is used by several devices to communicate with each other by sharing a particular physical frequency band based on Carrier Sense Multiple Access/Collision Avoidance (CSMA/CA), SSID is used to distinguish the network in the physical channel. That is, SSID is an identifier used to configure a logical WLAN network in a physical channel. Accordingly, communication is possible between nodes, e.g., APs or clients, which have the same SSIDs. Therefore, in order to use this method, each node should have the same SSID information in order to communicate with certain nodes using WLAN.

In the WLAN security setting process, compared with the existing wired LAN, WLAN is vulnerable to security, because it wirelessly communicates data using a particular frequency. Therefore, unlike the wired LAN, WLAN basically needs an authentication and encryption scheme. The authentication process permits an authorized node or user to access WLAN, and is used to encrypt and communicate data through a scheme predetermined between transmission and reception nodes, such that other nodes may not access the data.

In the Ad-hoc mode, open authentication and shared authentication are available, and authentication and encryption are achieved by a Wired Equivalent Privacy (WEP) scheme. That is, in order to communicate with certain nodes using WLAN, each node uses the same authentication and encryption scheme, and uses a WEP Key value in the Ad-hoc mode.

In the IP address setting process, because WLAN corresponds to a link layer (or Layer 2) in an Open System Interconnection (OSI) 7 Layer, an IP address is set for a WLAN interface for IP communication that is a network layer or actual Layer 3. Generally, for IP communication, nodes joining one broadcast domain should have IP addresses belonging to the same subnet, and the IP addresses should be unique in the broadcast domain. The nodes may each have several LAN cards or interfaces and several IP addresses, and each IP address should belong to a different subnet.

FIG. 1 is a flowchart illustrating a conventional setting and connection procedure for WLAN connection.

Referring to FIG. 1, in step 110, a user activates a WLAN interface by setting the WLAN to the Ad-hoc mode. Thereafter, the user inputs an SSID of the WLAN to set the SSID of the WLAN in step 120. In step 130, the user inputs a security key of the WLAN, in order to set the security key of WLAN. In step 140, the user inputs and sets an IP address of the WLAN. Consequently, Ad-hoc communication connection is achieved in step 145. However, as described above, for the WLAN connection, the user inputs information for the WLAN settings and connection in each step.

Additionally, checking and activating a state of the WLAN is possible through WLAN management software of the operating system. That is, the WLAN is turned On/Off using the software. Accordingly, the user should know how to use the WLAN management software, and should have knowledge concerning the state of the WLAN interface.

In addition, the user sets the WLAN to the Ad-hoc mode and sets the SSID and the WEP Key through the WLAN management software. Generally, in order to set the WLAN to the Ad-hoc mode and input the SSID and WEP Keys, the user reselects an SSID and WEP Key setting menu and sets them in an input window, after running the WLAN management software. However, as described above, this is not the easiest process as the user should have knowledge concerning the WLAN and know how to use the WLAN management software.

Commonly, a node accessing the Internet is assigned an IP address from a Dynamic Host Configuration Protocol (DHCP) server using DHCP. That is, the user uses the assigned IP address without directly setting the IP address. However, in an Ad-hoc WLAN connection, the user directly sets an IP address for the WLAN interface without using the DHCP scheme. Therefore, in order to set an IP address, the user should have knowledge of the IP address and know how to use IP address management software.

For the WLAN connection setting, the user should know how to use the WLAN and IP address management software, and have knowledge of WLAN and IP address. The use of WLAN may be complicated for the users who have no knowledge of WLAN and IP address or are unfamiliar with use of the WLAN and IP address management software. Further, this information is not the information that the user should know in order to perform communication using an application, as the main purpose of the user is to use the application after WLAN connection. Accordingly, it is inefficient and inconvenient for the user to input the setup and connection information one by one, and have to continuously change the settings due to frequent movement.

As described above, the user can use most of the applications using WLAN after setting an SSID, a security key and an IP address according to a predetermined procedure. However, the SSID, the security key and the IP address are not directly used in these applications, after being set. Therefore, it is inefficient for the user to input information one by one, and this setting procedure is a very complicated and inconvenient to the user, who is unfamiliar with use of WLAN and should continuously change settings due to his frequent movement.

SUMMARY OF THE INVENTION

The present invention addresses at least the above-mentioned problems and/or disadvantages and provides at least the advantages described below.

Accordingly, an aspect of the present invention is to provide a system and method for automatic WLAN connection between a portable terminal and a digital device, wherein a user can perform WLAN communication between the portable terminal and the digital device (e.g., a portable terminal, a PC, a camera, or a printer), each having a WLAN interface, without directly inputting an SSID, a security key, and an IP address.

Another aspect of the present invention is to provide a system and method for automatic WLAN connection between a portable terminal and a digital device, wherein the portable terminal and the digital device automatically generate and set an SSID, a security key, and an IP address using the same information, such that a user can conveniently access a WLAN.

In accordance with an aspect of the present invention, there is provided a method for automatic wireless connection to a digital device in a portable terminal. A phone number and an Electronic Serial Number (ESN) of the portable terminal are obtained. A WLAN is set to an Ad-hoc mode. An SSID of the WLAN is automatically generated using the phone number and the ESN of the portable terminal. A security key of the WLAN is automatically generated using the phone number and the ESN of the portable terminal. An IP address for the WLAN is automatically generated using the phone number and the ESN of the portable terminal. The digital device is wirelessly connected to using the IP address for the WLAN.

In accordance with another aspect of the present invention, there is provided a portable terminal for automatic wireless connection to a digital device. The portable terminal is configured to obtain a phone number and an ESN of the portable terminal, and set a WLAN to an Ad-hoc mode. The portable terminal is also configured to automatically generate an SSID of the WLAN using the phone number and the ESN of the portable terminal, and automatically generate a security key of the WLAN using the phone number and the ESN of the portable terminal. The portable terminal is further configured to automatically generate an IP address for the WLAN using the phone number and the ESN of the portable terminal, and wirelessly connect to the digital device using the IP address for the WLAN.

In accordance with another aspect of the present invention, there is provided a method for automatic wireless connection to a portable terminal in a digital device. A phone number and an ESN of the portable terminal are obtained. A WLAN is set to an Ad-hoc mode. An SSID of the WLAN is automatically generated using the phone number and the ESN of the portable terminal. A security key of the WLAN is automatically generated using the phone number and the ESN of the portable terminal. An IP address for the WLAN is automatically generated using the phone number and the ESN of the portable terminal. The portable terminal is wirelessly connected to using the IP address for the WLAN.

In accordance with another aspect of the present invention, there is provided a digital device for automatic wireless connection to a portable terminal. The digital device is configured to obtain a phone number and an ESN of the portable terminal, and set a WLAN to an Ad-hoc mode. The digital device is also configured to automatically generate an SSID of the WLAN using the phone number and the ESN of the portable terminal, and automatically generate a security key of the WLAN using the phone number and the ESN of the portable terminal. The digital device is further configured to automatically generate an IP address for the WLAN using the phone number and the ESN of the portable terminal, and wirelessly connect to the portable terminal using the IP address for the WLAN.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION

The matters defined in the description such as a detailed construction and elements are provided to assist in a comprehensive understanding of certain embodiments of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Among other things, the present invention provides a method for automatic WLAN connection between a portable terminal and a digital device, wherein a user performs WLAN communication between the portable terminal and the digital device, each having a WLAN interface, without directly inputting an SSID, a security key, and an IP address.

In accordance with an embodiment of the present invention, the portable terminal and the digital device use the same information, e.g., phone number, Electronic Serial Number (ESN), and Media Access Control (MAC) address. The user can conveniently access WLAN as the portable terminal and the digital device automatically generates and sets SSID, security key and IP address using the same information.

When a user wants to establish a WLAN connection between their portable terminal and a digital device, the user simply enters a WLAN connection command, e.g., presses a WLAN connection button on the portable terminal. Thereafter, the portable terminal and the digital device establish a connection using information about the portable terminal, e.g., phone number, ESN and/or MAC address.

Figure 1:
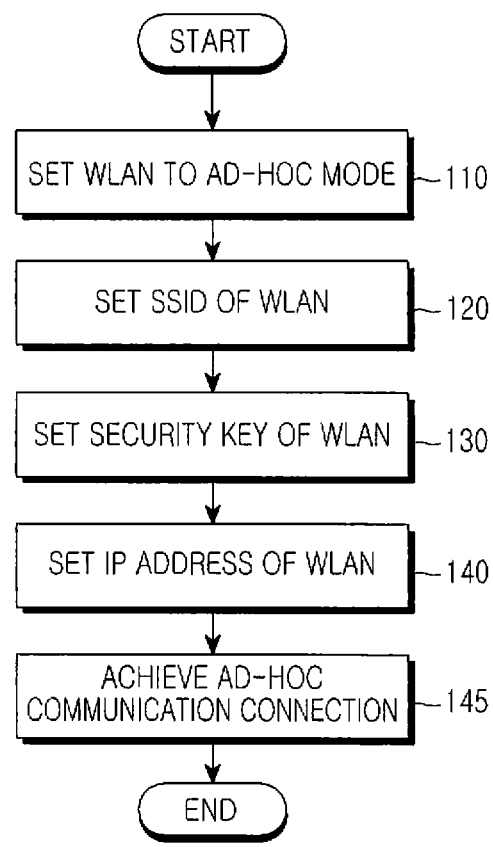
FIG. 1 is a flowchart illustrating a conventional setting and connection procedure for WLAN connection.
Figure 2:
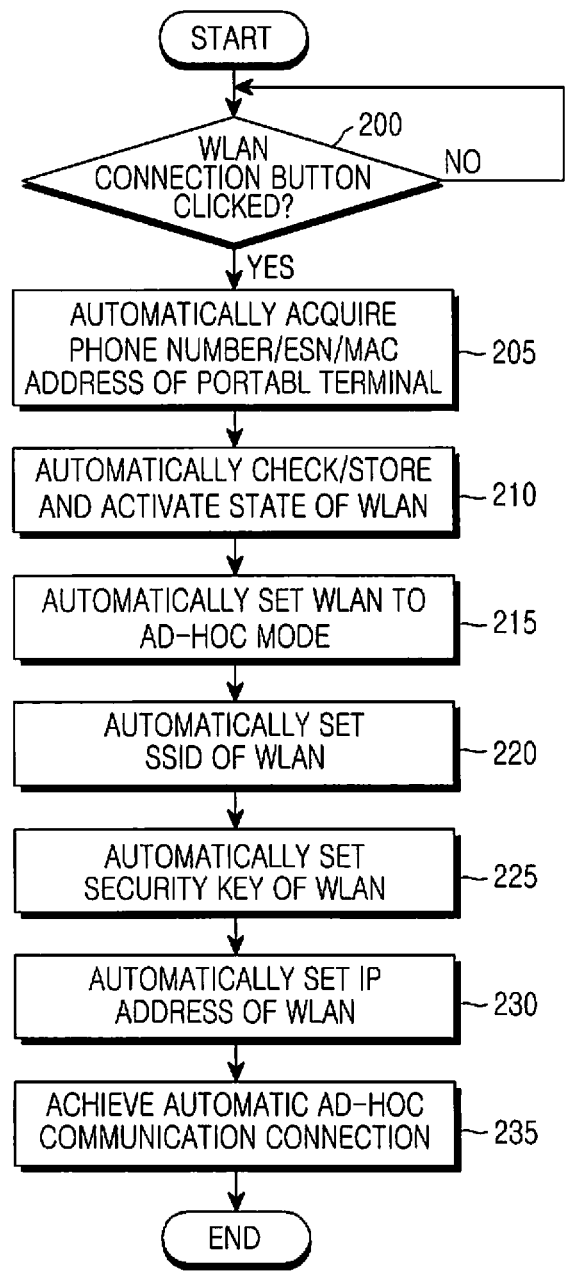
FIG. 2 is a flowchart illustrating an automatic WLAN connection procedure in a portable terminal according to an embodiment of the present invention.

FIG. 2 is a flowchart illustrating an automatic WLAN connection procedure in a portable terminal according to an embodiment of the present invention.

Referring to FIG. 2, the automatic WLAN connection procedure in the portable terminal is initiated when a user simply enters a WLAN connection command, e.g., clicks a WLAN connection button on the portable terminal or inserts a dedicated connector into the portable terminal in step 200. In step 205, the portable terminal automatically acquires information about the portable terminal, e.g., phone number/ESG/MAC address, stored therein. In step 210, the portable terminal automatically checks and stores the state (e.g., On/Off, an SSID, a security key, and an IP address) of a WLAN, and activates or changes the WLAN to the On state, if the WLAN is in the Off state.

In step 215, the portable terminal automatically sets the WLAN to the Ad-hoc mode. In step 220, the portable terminal automatically sets an SSID of the WLAN using the portable terminal information acquired in step 205. In step 225, the portable terminal automatically sets a security key of the WLAN using the acquired portable terminal information. Similarly, in step 230, the portable terminal automatically sets an IP address of the WLAN using the acquired portable terminal information. In step 235, automatic Ad-hoc wireless connection to the digital device is achieved based on the automatically set values.

Figure 3:
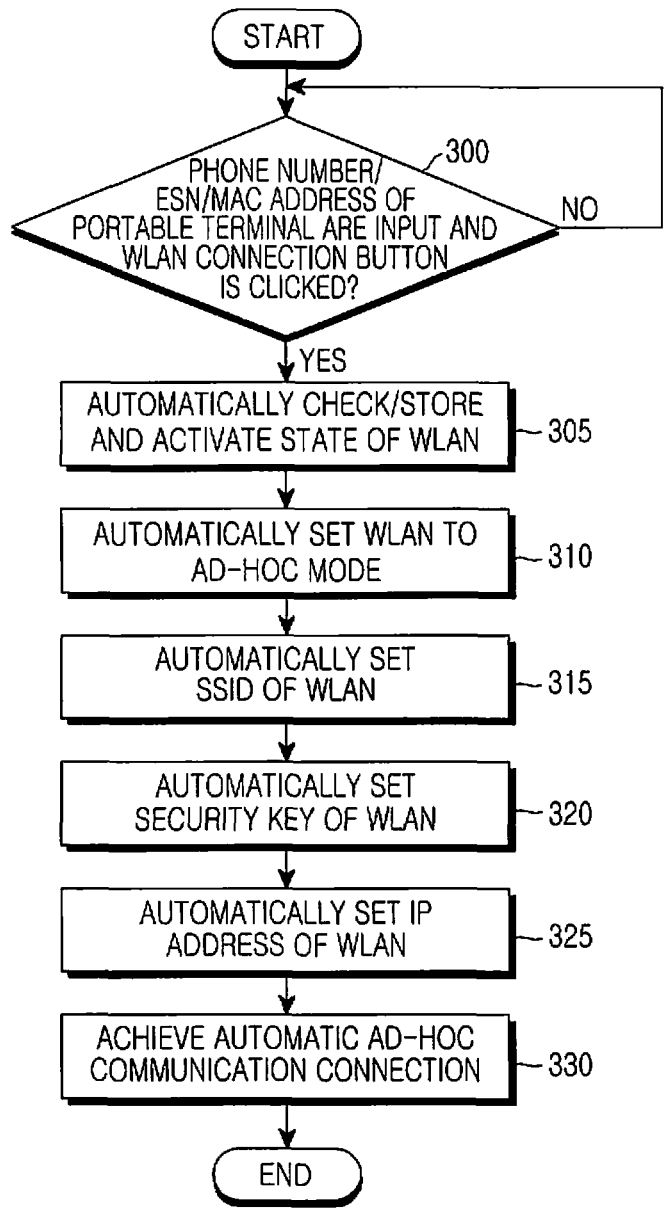
FIG. 3 is a flowchart illustrating an automatic WLAN connection procedure in a digital device according to an embodiment of the present invention.

FIG. 3 is a flowchart illustrating an automatic WLAN connection procedure in a digital device according to an embodiment of the present invention.

Referring to FIG. 3, in step 300, the automatic WLAN connection procedure is initiated when a user simply enters a WLAN connection command, e.g., clicks a WLAN connection button, after inputting information about the portable terminal, e.g., phone number/ESN/MAC address, of the portable terminal. Alternatively, the automatic WLAN connection procedure in the digital device may be initiated by the digital device automatically acquiring the phone number/ESN/MAC address of the portable terminal by insertion of a dedicated connector. If the connection procedure is initiated, steps 305 through 330 are performed in the portable terminal and the digital device in common. Further, steps 305 through 330 are the same as steps 210 through 235 in FIG. 2. Therefore, a repetitious description of step 305 through 330 will be omitted. Additionally, a more detailed description of the common operation in the portable terminal and the digital device will be provided below.

Figure 4:
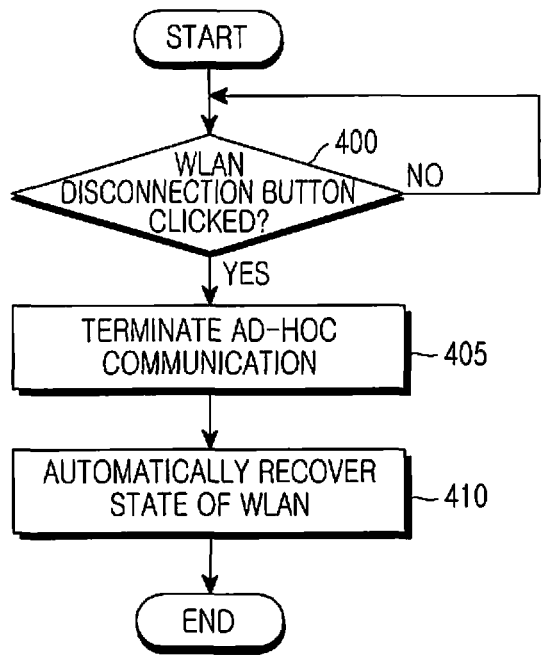
FIG. 4 is a flowchart illustrating an automatic WLAN disconnection procedure in a portable terminal and a digital device according to an embodiment of the present invention.

FIG. 4 is a flowchart illustrating an automatic WLAN disconnection procedure in a portable terminal and a digital device according to an embodiment of the present invention.

Referring to FIG. 4, a WLAN connection is terminated by performing a disconnection in at least one of the portable terminal and the digital device. Accordingly, when a user of the portable terminal enters a WLAN disconnection command, e.g., clicks a WLAN disconnection button on the portable terminal, in step 400, the portable terminal automatically terminates Ad-hoc communication in step 405. In step 410, the portable terminal recovers the WLAN state stored during automatic WLAN connection (for example, step 210 in FIG. 2).

Similarly, when an automatic WLAN disconnection procedure in a digital device is also initiated as the user clicks a WLAN disconnection button on the digital device or removes a dedicated connector from the digital device in step 400, the digital device automatically terminates Ad-hoc communication in step 405, and then recovers the WLAN state stored during automatic WLAN connection in step 410.

As illustrated in FIGS. 2 and 3, the connection procedures in the portable terminal and the digital device are the same except for the beginning part.

As to the beginning part of the connection procedure in the portable terminal, the user first enters a WLAN connection command, e.g., clicks a WLAN connection button, which is an action of initiating automatic WLAN connection to the digital device. In this manner, the user can click a WLAN connection button on the portable terminal. Alternatively, the connection procedure may be initiated as the user inserts a dedicated connector into the portable terminal.

However, regarding the beginning part of the connection procedure in the digital device, the connection procedure is initiated as the user clicks a WLAN connection button, after the digital device receives from the user the desired phone number/ESG/MAC address of the portable terminal, or as the digital device automatically acquires phone number/ESG/MAC address of the portable terminal by insertion of a dedicated connector.

The following operation is performed in the portable terminal and the digital device in common, and the common operation will be described in detail below.

Automatically acquiring information about the portable terminal, e.g., phone number/ESG/MAC address stored in the portable terminal, is common for the portable terminal and the digital device. Further, this information is used by both the portable terminal and the digital device for automatically setting information necessary for automatic wireless connection to the digital device (e.g., an SSID, a security key, and an IP address). For automatic wireless connection, SSIDs and security keys of the portable terminal and the digital device should be identical, and IP addresses should be identical in prefix. The portable terminal information (phone number/ESG/MAC address) for automatic wireless connection is determined by combining at least one of the information. A value obtained by the information combination represents a key for deriving all information (SSID, security key and IP address) that should be set for automatic wireless connection. Here, the value (Key) obtained by information combination refers to, for example, phone number, phone number+ESN, phone number+MAC address, etc. The value (Key) obtained by the information combination is identical in the portable terminal and the digital device.

In addition, automatically checking/storing and activating a state of the WLAN is common in the portable terminal and the digital device. More specifically, the current state (WLAN On/Off, SSID, security key and IP address) of WLAN is checked and stored in the portable terminal in order to store the state of the WLAN before automatic wireless connection between the portable terminal and the digital device and then restore the state to the original state after disconnection. If the state of the WLAN is an Off state, the WLAN is automatically activated by changing the state to an On state.

Next, the portable terminal and the digital device automatically set WLAN to the Ad-hoc mode, and automatically set SSID of WLAN.

Figure 5:
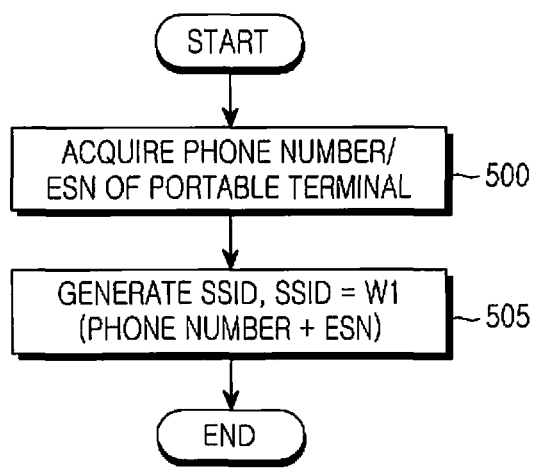
FIG. 5 is a flowchart illustrating an SSID generation process according to an embodiment of the present invention.

FIG. 5 is a flowchart illustrating an SSID generation process according to an embodiment of the present invention. More specifically, the SSID is generated by the same method in the portable terminal and the digital device, as described in FIG. 5.

In step 500, a phone number and ESN of the portable terminal are acquired. Actually, the portable terminal acquires its phone number and ESN through Application Programming Interface (API) of the operating system, whereas the digital device acquires the phone number and ESN of the portable terminal from a user input or a server. Thereafter, in step 505, a 32-bytes SSID is generated by a hash function W1 (phone number+ESN) by combining the acquired phone number and ESN information.

In addition, the portable terminal and the digital device each automatically set a security key of WLAN. Here, WEP Key is generated by the same method in the portable terminal and the digital device.

Figure 6:
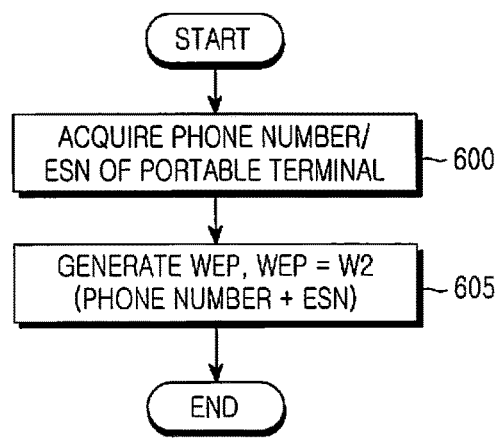
FIG. 6 is a flowchart illustrating a WEP Key generation process according to an embodiment of the present invention.

FIG. 6 is a flowchart illustrating a WEP Key generation process according to an embodiment of the present invention.

In step 600, a phone number and ESN of the portable terminal are acquired, in which the portable terminal acquires its phone number and ESN through API of the operating system and the digital device acquires the phone number and ESN of the portable terminal from a user input or a server. Thereafter, in step 605, a 13-byte text-type WEP Key is generated by a hash function W2 (phone number+ESN) by combining the acquired phone number and ESN information.

Next, the portable terminal and the digital device each automatically set an IP address of WLAN. The portable terminal and the digital device automatically generate private IP addresses having the same prefix. For example, a range of IP addresses that can be assigned as private IP addresses is as shown in Table 1 below.

TABLE 1

Class A: 10.0.0.0~10.255.255.255 (10/8 prefix)
Class B: 172.16.0.0~172.31.255.255 (172.16/12 prefix)
Class C: 192.168.0.0~192.168.255.255 (192.168/16 prefix)

In accordance with an embodiment of the present invention, as to a private IP address (Network Part+Host Part) for wireless connection between the portable terminal and the digital device, all of available 24 bits (24 prefix) are used as a network part by applying Classless Inter-Domain Routing (CIDR). That is, a total of 256 addresses (host part=8 bits) can be assigned to every subnet. However, because 0 and 255 are used for separate purposes in the host part, in actuality, the available address range of the host part has a total of 254 addresses, i.e., 1 to 254.

In accordance with an embodiment of the present invention, 8 bits area assigned to the host part to connect up to a total of 254 devices during final wireless connection between the portable terminals and the digital devices considering a 1:1 connection, and also 1:N, N:1, and N:N connections, and to connect other devices as well.

Figure 7:
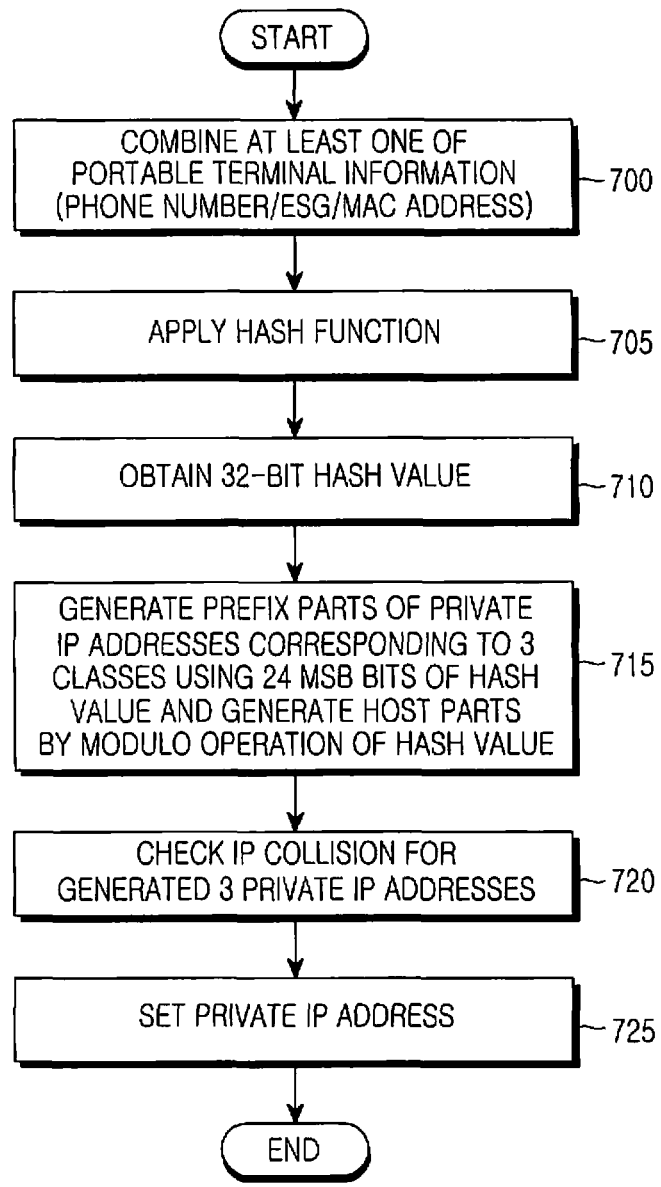
FIG. 7 is a flowchart illustrating a private IP address generation and setting process according to an embodiment of the present invention.

Regarding the portable terminal information (phone number/ESN/MAC address), reference is made to FIG. 7 to describe in detail a method of generating and setting IP addresses (Prefix Part+Host Part) of the portable terminal and the digital device using the value (Key) obtained by combining at least one of the information.

FIG. 7 is a flowchart illustrating a private IP address generation and setting process according to an embodiment of the present invention.

In step 700, at least one of the portable terminal information (phone number/ESN/MAC address) is combined. A hash function is applied by receiving a value (Key) obtained by the information combination in step 705, and a 32-bit hash value is obtained by the hash function in step 710. In step 715, prefix parts of 3 private IP addresses corresponding to a class A, a class B, and a class C are generated using 24 MSB bits of a 32-bit hash value (called X), and host parts are generated by a modulo operation of the 32-bit hash value. Here, because the host part can use a number of 1 to 254 except for 0 and 255, the host part in the portable terminal is generated by (X mod 254+1) and the host part in the digital device is generated by subtracting the host part of the portable terminal from 255. In the portable terminal and the digital device, private IP addresses are generated in pairs for each of 3 classes. Accordingly, the portable terminal and the digital device can generate the same prefix parts, with only the host parts being different, and can distinguish the host part of each other.

In step 720, the portable and the digital device check IP collision for the generated 3 private IP addresses. The IP collection check is achieved by comparing prefix parts set in their different interfaces with prefix parts of the generated 3 private IP addresses. If interfaces having the same prefix parts exist in the generated 3 private IP addresses, the IP addresses are deleted.

In step 725, the portable terminal and the digital device each determine and set private IP addresses to be used for wireless connection, as they recognize that the private IP addresses are valid that were generated by the other party by checking the presence/absence of a response to Internet Control Message Protocol (ICMP) Ping test on the private IP addresses left after the IP collision check. A plurality of IP addresses may achieve successful response by the response check for the ICMP Ping test after the IP collision check. In this case, the private IP addresses to be used for wireless connection are determined and set by the class priority.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for automatic wireless connection to a digital device in a portable terminal, comprising:

in response to an input for turning on a Wireless Local Area Network (WLAN), obtaining at least one of a phone number, an Electronic Serial Number (ESN) or a Media Access Control (MAC) address of the portable terminal;

setting the WLAN;

automatically providing a Service Set Identifier (SSID) of the WLAN by using at least one of the phone number, the ESN or the MAC address of the portable terminal;

automatically providing a security key of the WLAN by using at least one of the phone number, the ESN or the MAC address of the portable terminal;
automatically providing an Internet Protocol (IP) address for the WLAN by using at least one of the phone number, the ESN or the MAC address of the portable terminal; and
wirelessly connecting to the digital device using the SSID, the security key and the IP address for the WLAN.

2. The method of claim 1, further comprising checking and activating a state of the WLAN, after at least one of the phone number, the ESN or the MAC address of the portable terminal are obtained.

3. The method of claim 1, wherein providing the SSID comprises providing a 32-byte SSID by a hash function by combining at least one of the phone number, the ESN or the MAC address of the portable terminal.

4. The method of claim 1, further comprising:
connecting the portable terminal to the digital device via a dedicated connector; and
delivering at least one of the phone number, the ESN or the MAC address of the portable terminal to the digital device via the dedicated connector.

5. The method of claim 1, wherein providing the IP address for the WLAN comprise:
automatically providing a plurality of IP addresses for the WLAN using at least one of the phone number, the ESN or the MAC address of the portable terminal;
selecting one of the plurality of IP addresses; and
wirelessly connecting to the digital device using the selected IP address.

6. A portable terminal for automatic wireless connection to a digital device, the portable terminal comprising:
a hardware processor configured to:
obtain at least one of a phone number, an Electronic Serial Number (ESN) or a Media Access Control (MAC) address of the portable terminal;
in response to an input for turning on a Wireless Local Area Network (WLAN), set the WLAN;
automatically provide a Service Set Identifier (SSID) of the WLAN by using at least one of the phone number, the ESN or the MAC address of the portable terminal;
automatically provide a security key of the WLAN by using at least one of the phone number, the ESN or the MAC address of the portable terminal;
automatically provide an Internet Protocol (IP) address for the WLAN by using at least one of the phone number, the ESN or the MAC address of the portable terminal; and
wirelessly connect to the digital device using the SSID, the security key and the IP address for the WLAN.

7. The portable terminal of claim 6, wherein the hardware processor further configured to check and activate a state of the WLAN, after at least one of the phone number, the ESN or the MAC address of the portable terminal are obtained.

8. The portable terminal of claim 6, wherein the hardware processor configured to provide a 32-byte SSID by a hash function by combining at least one of the phone number, the ESN or the MAC address of the portable terminal.

9. The portable terminal of claim 6, wherein the hardware processor configured to provide a 13-byte text-type Wired Equivalent Privacy (WEP) key by a hash function by combining at least one of the phone number, the ESN or the MAC address of the portable terminal.

10. The portable terminal of claim 6, wherein the hardware processor configured to:

connect the portable terminal to the digital device via a dedicated connector; and
deliver at least one of the phone number, the ESN or the MAC address of the portable terminal to the digital device via the dedicated connector.

11. A digital device for automatic wireless connection to a portable terminal, the digital device comprising:
a hardware processor configured to:
obtain at least one of a phone number, an Electronic Serial Number (ESN) or a Media Access Control (MAC) address of the portable terminal;
in response to an input for turning on a Wireless Local Area Network (WLAN), set the WLAN;
automatically provide a Service Set Identifier (SSID) of the WLAN by using at least one of the phone number, the ESN or the MAC address of the portable terminal;
automatically provide a security key of the WLAN by using at least one of the phone number, the ESN or the MAC address of the portable terminal;
automatically provide an Internet Protocol (IP) address for the WLAN by using at least one of the phone number, the ESN or the MAC address of the portable terminal; and
wirelessly connect to the portable terminal using the SSID, the security key and the IP address for the WLAN.

12. The digital device of claim 11, wherein the -hardware processor further configured to check and activate a state of the WLAN, after at least one of the phone number, the ESN or the MAC address of the portable terminal is obtained.

13. The digital device of claim 11, wherein the hardware processor further configured to receive at least one of the phone number, the ESN or the MAC address of the portable terminal, as input from a user.

14. The digital device of claim 11, wherein the -hardware processor configured to provide a 32-byte SSID by a hash function by combining at least one of the phone number, the ESN or the MAC address of the portable terminal.

15. The digital device of claim 11, wherein the hardware processor configured to:
connect the digital device to the portable terminal via a dedicated connector; and
automatically obtain at least one of the phone number, the ESN or the MAC address of the portable terminal from the portable terminal via the dedicated connector.

16. A non-transitory storage medium storing instructions configured to cause, when executed by at least one processor of a portable terminal, the at least one processor to perform at least one operation, the at least one operation comprising:
in response to an input for turning on a Wireless Local Area Network (WLAN), obtaining at least one of a phone number, an Electronic Serial Number (ESN) or a Media Access Control (MAC) address of the portable terminal;
setting the WLAN;
automatically providing a Service Set Identifier (SSID) of the WLAN by using at least one of the phone number, the ESN or the MAC address of the portable terminal;
automatically providing a security key of the WLAN by using at least one of the phone number, the ESN or the MAC address of the portable terminal;
automatically providing an Internet Protocol (IP) address for the WLAN by using at least one of the phone number, the ESN or the MAC address of the portable terminal; and
wirelessly connecting to a digital device using the SSID, the security key and the IP address for the WLAN.

17. The storage medium of claim 16, further comprising checking and activating a state of the WLAN, after at least one of the phone number, the ESN or the MAC address of the portable terminal are obtained.

18. The storage medium of claim 16, wherein providing the SSID comprises providing a 32-byte SSID by a hash function by combining at least one of the phone number, the ESN or the MAC address of the portable terminal.

19. The storage medium of claim 16, further comprising:
   connecting the portable terminal to the digital device via a dedicated connector; and
   delivering at least one of the phone number, the ESN or the MAC address of the portable terminal to the digital device via the dedicated connector.

20. The storage medium of claim 16, wherein providing the IP address for the WLAN comprises:
   automatically providing a plurality of IP addresses for the WLAN using at least one of the phone number, the ESN or the MAC address of the portable terminal;
   selecting one of the plurality of IP addresses; and
   wirelessly connecting to the digital device using the selected IP address.

\* \* \* \* \*